Figure 1:
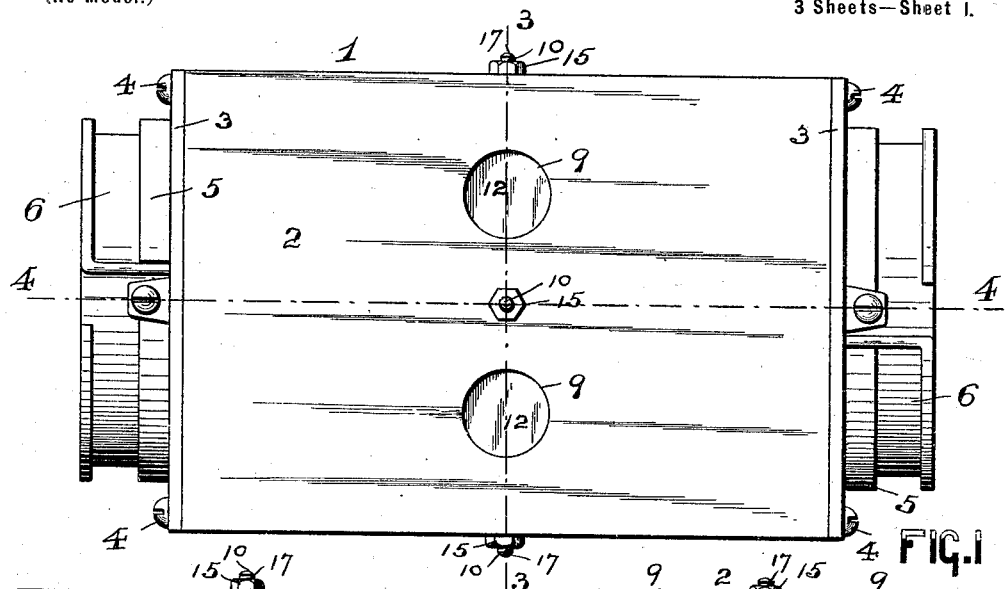

No. 695,243. Patented Mar. 11, 1902.
J. H. STAHLEY.
ELECTRIC JUNCTION OR OUTLET BOX.
(Application filed Jan. 17, 1902.)

(No Model.) 3 Sheets—Sheet 1.

WITNESSES:
Geo. S. Richards
F. H. W. Fraentzel

INVENTOR:
JOHN H. STAHLEY,
BY Fred C. Fraentzel,
ATTORNEY

No. 695,243. Patented Mar. 11, 1902.
J. H. STAHLEY.
ELECTRIC JUNCTION OR OUTLET BOX.
(Application filed Jan. 17, 1902.)
(No Model.) 3 Sheets—Sheet 2.

WITNESSES:
Geo. D. Richards
F. H. W. Fraentzel

INVENTOR:
JOHN H. STAHLEY,
BY
Fred'k C. Fraentzel,
ATTORNEY

No. 695,243. Patented Mar. 11, 1902.
J. H. STAHLEY.
ELECTRIC JUNCTION OR OUTLET BOX.
(Application filed Jan. 17, 1902.)
(No Model.) 3 Sheets—Sheet 3.
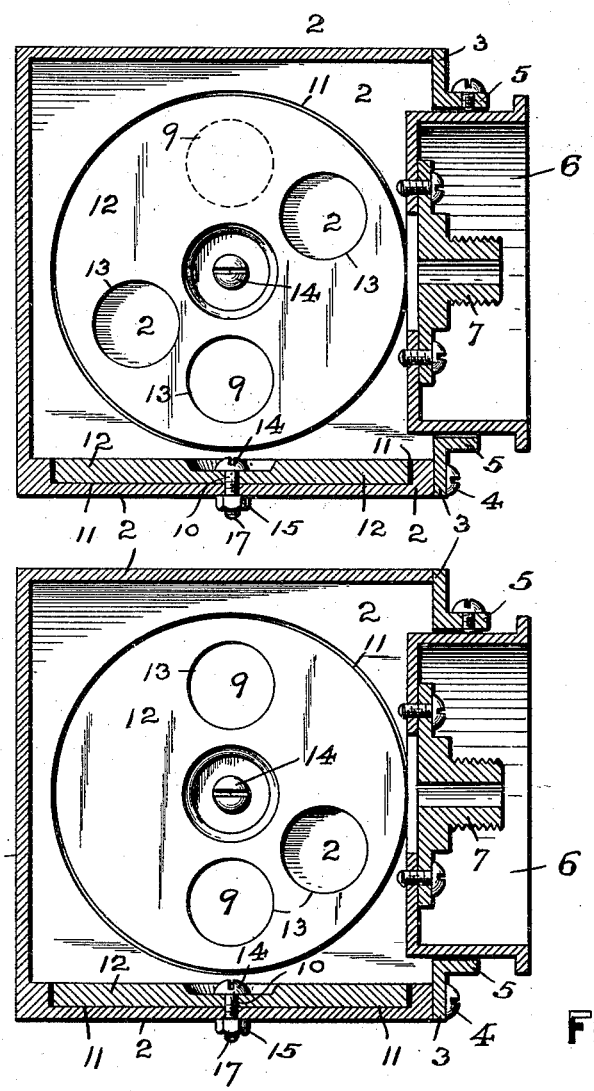
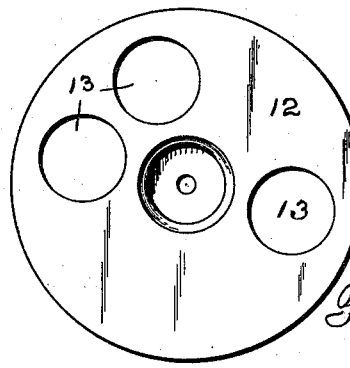
WITNESSES:
Geo. S. Richards
F. H. W. Fraentzel
INVENTOR:
JOHN H. STAHLEY,
BY
Fred L. Fraentzel,
ATTORNEY

UNITED STATES PATENT OFFICE.

JOHN H. STAHLEY, OF NEW YORK, N. Y.

ELECTRIC JUNCTION OR OUTLET BOX.

SPECIFICATION forming part of Letters Patent No. 695,243, dated March 11, 1902.

Application filed January 17, 1902. Serial No. 90,191. (No model.)

*To all whom it may concern:*

Be it known that I, JOHN H. STAHLEY, a citizen of the United States, residing at New York, in the county of New York and State of New York, have invented certain new and useful Improvements in Electric Junction or Outlet Boxes; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention relates generally to improvements in that class of outlet or junction boxes for electrical conductors which are placed in the walls or ceilings of buildings for the attachment to the said boxes of an electric fixture or fixtures. These outlet or junction boxes are known to the trade as "universal" boxes and are made in one or more of their sides with openings or holes for the attachment to the same of the usual conduits or pipes through which the electric conductors or wires are introduced into the body of the box for their connection with an electric fixture or fixtures which are to be secured in position against parts of the box. Outlet or junction boxes of this character are usually made in more than one of their sides, as well as in the bottom or base of the box, with one or more holes or openings, usually two holes in each side or in the bottom, and the primary object of my invention is to so construct the body of the box that it may be cast with the requisite number of holes or openings in each side or in the bottom, if desired, and then providing each side of the box or the bottom with means capable of being arranged over one or more of the openings in a side or the bottom, so that one or more of the openings may be opened for the attachment of a conduit or conduits or that all the openings in a side or the bottom of the box may be kept closed, according as the circumstances may demand, owing to the various locations of the electric conduits and conductors and the location of the electric fixture which is to be connected with the box.

A further object of this invention is to provide a simple, cheap, and efficient outlet or junction box of such a construction that it is adapted for use with any number of conduits and the electric conductors inclosed in said conduits.

My invention therefore consists in the novel construction by casting or otherwise of the junction or outlet boxes, to be hereinafter more fully set forth; and, furthermore, the invention consists in the several novel arrangements and combinations of the various parts as well as in the details of the construction thereof, all of which will be described in detail in the following specification and then finally embodied in the clauses of the claim.

The invention is clearly illustrated in the accompanying drawings, in which—

Figure 2:
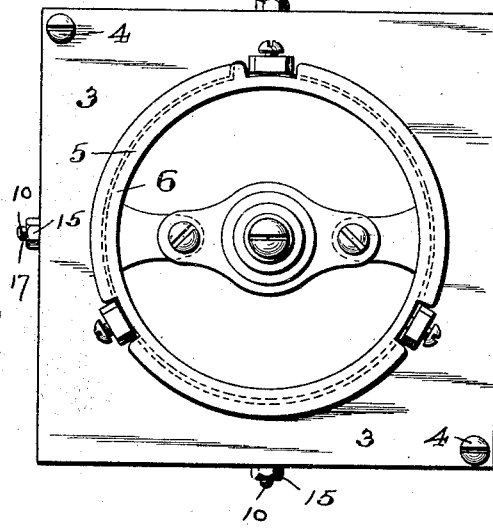
Figure 3:
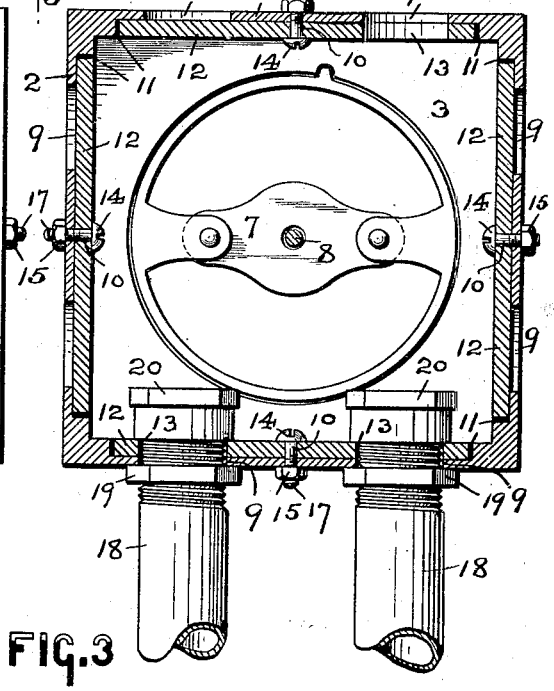
Figure 4:
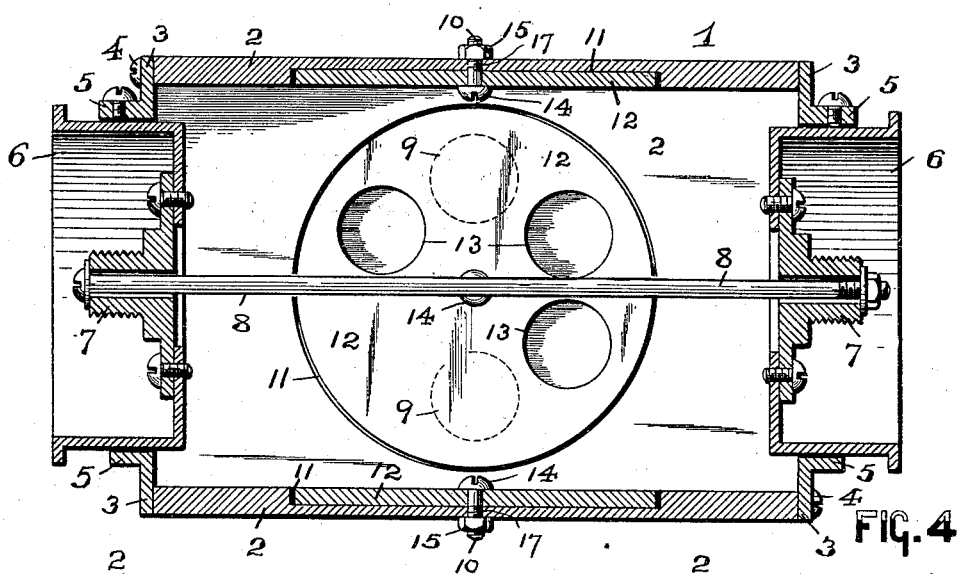
Figures 5, 6:
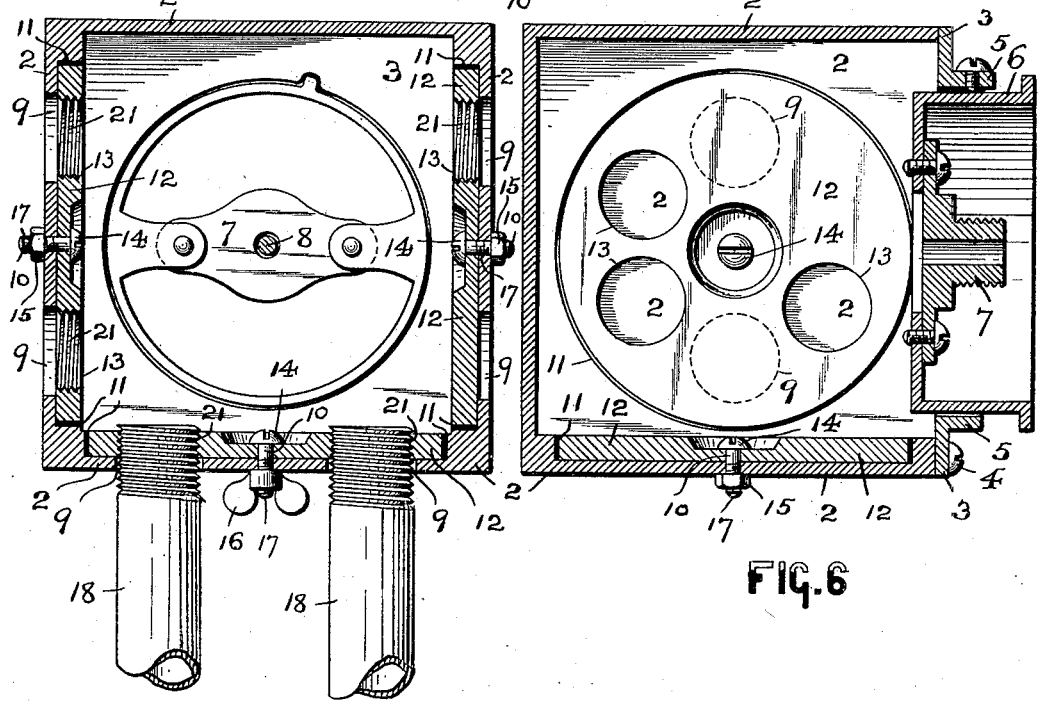

Figure 1 is a face or top view of one form of outlet or junction box provided with a conduit-hole opening and closing means embodying the principles of my present invention. Fig. 2 is a view of one of the ends of the said box; and Fig. 3 is a vertical cross-section of the box, taken on line 3 3 in said Fig. 1 of the drawings. Fig. 4 is a horizontal section taken on line 4 4 in the said Fig. 1. Fig. 5 is a sectional representation of an outlet-box known as the "single-type" box, provided with a conduit-hole opening and closing means of a slightly-modified form of construction, but still embodying the principal features of my present invention. Fig. 6 is a horizontal section of an outlet-box, the hole opening and closing device of the box being represented in that position when it closes both of the openings in the side of the box. Fig. 7 is a similar view of the box and the hole opening and closing device, the latter being represented in its position while closing either one of the two openings in the side of the box; and Fig. 8 is another similar view of the parts represented in Figs. 6 and 7, illustrating the hole opening and closing device in its relative position against the inner surface of one of the sides of the box when two of the conduit-holes in the side of the box are to be opened. Fig. 9 is a face view of the conduit-hole opening and closing device detached from its operative position in the box.

Similar characters of reference are employed in all of the said above-described views to indicate corresponding parts.

In the said drawings, which accompany the present specification, I have illustrated the employment of a conduit-hole opening and closing device made according to the principles of my present invention, in connection with junction or outlet boxes such as are illustrated and described in my previous Letters Patent Nos. 689,138 and 689,139; but it will be clearly conclusive from an inspection of the present drawings and from the following description of my invention that my novel form of conduit-hole opening and closing device may be used with any other known construction of box.

In the said drawings the reference character 1 indicates one form of outlet or junction box, comprising the usual sides 2 and the open-ended covers 3, suitably secured in position by means of screws 4 or any other means suitable for the purpose. In this form of box each cover is provided with an annular shoulder or projection 5, which surrounds the large opening in the said cover, and arranged in said openings of the various covers 3 are the usual sleeves 6, provided with the usual forms of fixture-studs 7. The boxes 1 may be either of the "double-end" type, as illustrated in Figs. 1 to 4, inclusive, or of the "single" type, (represented in Figs. 5 to 8, inclusive.) Where two of the sleeves 6 and fixture-studs 7 are employed with one box, these fixture-studs 7 are usually connected by a suitable tie bolt or rod 8, as clearly indicated in Fig. 4 of the drawings. The sides 2 of the boxes and sometimes the bottom or base are made with suitably-disposed conduit holes or openings 9, usually two holes arranged in vertical alinement, as indicated in the several figures of the drawings.

Arranged so as to be capable of rotation upon a pivotal pin or screw 10 against the inner surface of each side of the box and preferably in a correspondingly-formed recess or depression 11 is a disk or plate 12, which is made with suitably-disposed openings or holes 13, adapted to register with one or more of the said openings 9 in the manner and for the purposes to be presently more fully described. In order that each disk or plate 12 may be retained in its operative and rotative position against the inner surface of the side of the box or within the said recess or depression 11 against displacement from the pivotal pin or screw 10, the latter has a head 14 on one end and a suitable nut 15 or a thumb-screw 16 on its opposite and screw-threaded end portion 17, as shown, and by means of which the said disk or plate 12 can also be immovably fixed in its adjusted position, as will be clearly understood. Usually the said disk or plate 12 is made with three of such openings 13, which are spaced in the manner illustrated in the accompanying drawings, so that one or two of the said openings 13 in the said disk 12 can be made to register with one or both of the holes or openings 9 in a side or in the base of the box, as clearly illustrated in Figs. 7 and 8 of the drawings, or that said disk 12 may be turned to such a position to entirely close the several holes or openings 9, as indicated in Figs. 1, 4, and 6 of the drawings. It will be understood, however, that I do not limit my invention to the arrangements and the number of openings 13 as illustrated in the accompanying drawings, nor do I confine myself to the exact number and arrangement of the openings 9 in the various parts of the box. It will also be evident that the box may be made in any one or all of its sides as well as in its bottom with such openings 9, a corresponding number of disks 12 being employed for the purposes of establishing a complete opening or openings in one or more of the sides or in the bottom of the box.

From an inspection of Fig. 3 it will be seen that the threaded end of the conduit or conduits 18 are passed from the outer portions of the box directly through the registering openings 9 and 13 and then secured in position by means of a nut 19 and an outlet-nipple 20, or the openings 13 in the disk 12 may be provided with screw-threads 21, as indicated in Fig. 5 of the drawings, into which the screw-threaded end portion of the conduit or pipe 18 can be screwed after having been passed through the cylindrical and slightly-larger opening 9 in the side of the box, as clearly represented in said figure.

I am fully aware that changes may be made in the various arrangements and combinations of the several parts and that the various parts, and especially the disk or plate 12, may be stamped from sheet metal without departing from the scope of my present invention. Hence I do not limit my invention to the exact arrangements and combinations of the various parts as herein described and as illustrated in the accompanying drawings, nor do I confine myself to the exact details of the construction of the said parts.

Having thus described my invention, what I claim is—

1. A junction or outlet box for electrical conduits and conductors having one or more openings in one or more of its sides, or in its bottom, and correspondingly-arranged means rotatively placed against one or more of the sides or the bottom of said box and constructed to open and close one or more or all of the said openings, substantially as and for the purposes set forth.

2. A junction or outlet box for electrical conduits and conductors having one or more openings in one or more of its sides, or in its bottom, and a disk slidably arranged against one or more of the sides, or against the bottom, of said box, the disk or disks being provided with one or more openings adapted to register with one or more of the openings in the box or to close said openings, substantially as and for the purposes set forth.

3. In a junction or outlet box for electrical conduits and conductors, the combination, with a side or bottom of the box having a depression or recess and one or more openings, and a disk movably arranged in said depression or recess provided with one or more openings adapted to register with one or more of the openings in the side or bottom or to close said openings, substantially as and for the purposes set forth.

4. In a junction or outlet box for electrical conduits and conductors, the combination, with a side or bottom of the box provided with an opening or openings, of a pivotal pin in said side or bottom, a disk rotatively arranged on said pin, said disk being provided with one or more openings adapted to register with one or more of the openings in the side or bottom or to close said openings, and means on said pin for fixing said disk in its adjusted relation to the said opening or openings in the side or bottom of the box, substantially as and for the purposes set forth.

5. In a junction or outlet box for electrical conduits and conductors, the combination, with a side or bottom of the box provided with a depression or recess and one or more openings, of a pivotal pin in said side or bottom, a disk on said pin and rotatively arranged in said depression or recess, said disk being provided with one or more openings adapted to register with one or more of the openings in the side or bottom or to close said openings, and means on said pin for fixing said disk in its adjusted relation to the said opening or openings in the side or bottom of the box, substantially as and for the purposes set forth.

6. An electric outlet or similar box having an opening or openings for the reception of a conduit or conduits, of a rotatively-arranged opening and closing device in said box, substantially as and for the purposes set forth.

7. An electric outlet or similar box having an opening or openings for the reception of a conduit or conduits, of a slidably-arranged opening and closing device in said box, and means for securing said slidably-arranged opening and closing device in its adjusted position, substantially as and for the purposes set forth.

8. An electric outlet or similar box having an opening or openings for the reception of a conduit or conduits, of a rotatively-arranged opening and closing disk provided with one or more openings adapted to register with the opening or openings in the body of the box, substantially as and for the purposes set forth.

9. An electric outlet or similar box having a pair of openings 9, a pivotal pin in alinement with said openings, and a disk rotatively arranged on said pin, said disk being provided with three openings, two of said openings being in alinement with the central axis of said pivotal pin, substantially as and for the purposes set forth.

10. An electric outlet or similar box having a pair of openings 9, a pivotal pin in alinement with said openings, and a disk rotatively arranged on said pin, said disk being provided with three openings, two of said openings being in alinement with the central axis of said pivotal pin, a screw portion on said pin, and a head and nut connected with said pin for securing said disk in its adjusted relation to the openings in the box, substantially as and for the purposes set forth.

In testimony that I claim the invention set forth above I have hereunto set my hand this 13th day of January, 1902.

JOHN H. STAHLEY.

Witnesses:
FREDK. C. FRAENTZEL,
AUG. LEE.